T. A. EDISON.
Electrical Regulators for Transmitting Instruments.
No. 142,688. Patented September 9, 1873.
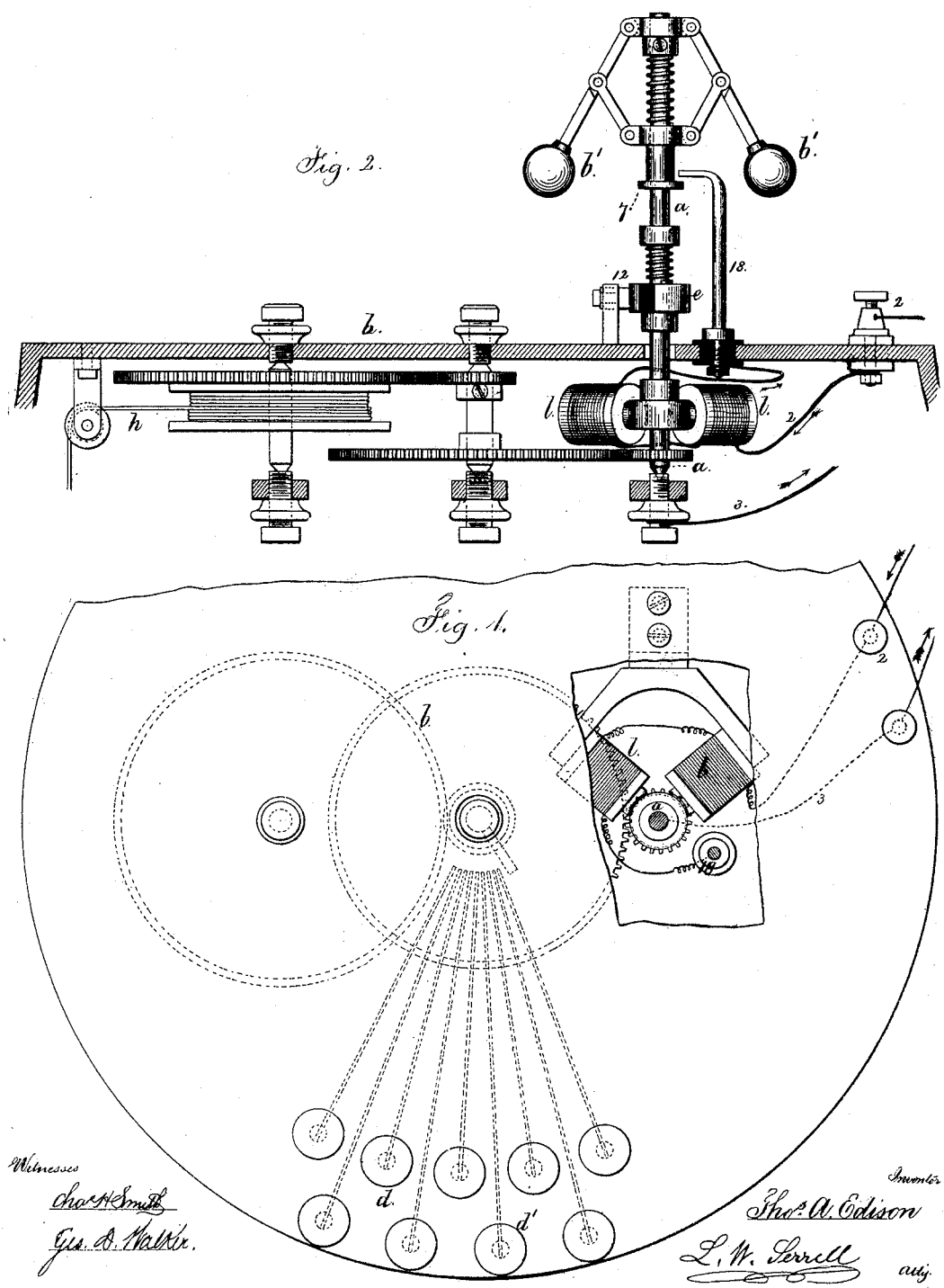

UNITED STATES PATENT OFFICE.

THOMAS A. EDISON, OF NEWARK, NEW JERSEY, ASSIGNOR TO THE GOLD AND STOCK TELEGRAPH COMPANY, OF NEW YORK, N. Y.

IMPROVEMENT IN ELECTRICAL REGULATORS FOR TRANSMITTING-INSTRUMENTS.

Specification forming part of Letters Patent No. 142,688, dated September 9, 1873; application filed March 13, 1873.

*To all whom it may concern:*

Be it known that I, THOMAS A. EDISON, of Newark, in the county of Essex and State of New Jersey, have invented an Improvement in Telegraph Transmitting-Instruments, of which the following is a specification:

This invention relates to means for regulating the speed of the pulsator-shaft in that class of transmitting-instruments in which said shaft is revolved by an electromotor, weight, or spring.

My improvement consists in employing an electro-magnet with its cores contiguous to the pulsator-shaft to check the speed of said shaft when it exceeds its maximum or determined rate by the magnetism of the cores attracting said shaft and retarding its movement.

The circuit to the electro-magnet is closed by the governor on the shaft rising by the increase of speed and bringing a flanged sleeve in contact with an insulated post, and opened when their contact is broken by the slight diminution in speed of the shaft, and consequent fall of the governor and its sleeve, when the electro-magnet ceases its action upon the shaft.

In the drawing, Figure 1 is a plan, and Fig. 2 is a section of part of a transmitting-instrument sufficient to illustrate my improvement.

$b$ represents the bed of the instrument, and beneath this is a train of gearing for revolving the pulsator-shaft $a$, said gearing being operated by a weight at the end of the cord or rope $h$; or my improvement is equally available where the pulsator-shaft is revolved by an electromotor, or by a spring and gearing.

The pulsator $e$ upon the shaft $a$ acts with the circuit-closing lever or spring 12 to open and close the main-line or local circuit, as in my patent No. 131,343, and a reference is hereby expressly made to the same for the action of this pulsator, and for the construction and operation of the finger-keys $d$ $d'$, shown by dotted lines in Fig. 1, as the aforesaid patent sets these parts forth and the objects accomplished.

The electro-magnets $l$ for regulating the speed of the shaft $a$ are placed with their cores contiguous to an iron or steel hub on said shaft, as shown in Fig. 1, and the enlargement of the shaft at this point gives ample metallic surface for the magnetism of the cores to act upon. These magnets $l$ are in a local circuit, 2 3, connected with the shaft $a$, and also to the insulated post 18. $b'$ is the governor revolving with the shaft $a$, and provided with a sleeve, upon which is a flange, 7, as in aforesaid patent. As the governor rises by increase of speed, the flange 7 comes in contact with the end of the insulated post 18, and closes the circuit to the magnets $l$, which, by their attraction upon the shaft $a$, retard its speed. This slight diminution of speed causes the governor-ball to fall and breaks the circuit at 7 18, and upon the speed again increasing the circuit is again closed by 7 and 18 coming in contact, and the speed is checked, as before.

In the aforesaid patent the contact of 7 and 18 by increased speed lessens the current to the motor. In the present instance the magnetic brake formed by the magnets $l$ checks the speed. The cores of these magnets might be loose within the helices; or the magnets might be upon a spring-arm, so as to be brought into contact with the shaft by the attraction, if desired.

I claim as my invention—

The speed-regulator consisting of the electro-magnet $l$, shaft $a$, and governor, in combination with the circuit-closer and pulsator, substantially as and for the purposes set forth.

Signed by me this 7th day of March, A. D. 1873.

THOMAS A. EDISON.

Witnesses:
GEO. T. PINCKNEY,
CHAS. H. SMITH.